(12) United States Patent
Reilly

(10) Patent No.: US 12,196,315 B2
(45) Date of Patent: Jan. 14, 2025

(54) TUBE IN TUBE LUBRICATION FOR A GAS CYLINDER

(71) Applicant: Barnes Group Inc., Bristol, CT (US)

(72) Inventor: Steven J. Reilly, Westlake, OH (US)

(73) Assignee: BARNES GROUP INC., Bristol, CT (US)

( * ) Notice: Subject to any disclaimer, the term of this patent is extended or adjusted under 35 U.S.C. 154(b) by 0 days.

(21) Appl. No.: 18/283,893

(22) PCT Filed: Mar. 25, 2022

(86) PCT No.: PCT/US2022/021868
§ 371 (c)(1),
(2) Date: Sep. 25, 2023

(87) PCT Pub. No.: WO2022/204469
PCT Pub. Date: Sep. 29, 2022

(65) Prior Publication Data
US 2024/0175493 A1     May 30, 2024

Related U.S. Application Data

(60) Provisional application No. 63/165,977, filed on Mar. 25, 2021.

(51) Int. Cl.
| | |
|---|---|
| F16J 10/04 | (2006.01) |
| F16J 1/08 | (2006.01) |
| F16J 10/02 | (2006.01) |
| F16N 1/00 | (2006.01) |
| F16N 7/32 | (2006.01) |
| B21D 24/02 | (2006.01) |

(52) U.S. Cl.
CPC .......... *F16J 10/04* (2013.01); *F16J 1/08* (2013.01); *F16J 10/02* (2013.01); *F16N 1/00* (2013.01); *F16N 7/32* (2013.01); *B21D 24/02* (2013.01)

(58) Field of Classification Search
CPC ...... F16J 1/08; F16J 10/02; F16N 1/00; F16N 7/32
See application file for complete search history.

(56) References Cited

U.S. PATENT DOCUMENTS 2,745,660 A * 5/1956 Delahay ............... F16J 1/09
                                                184/18
2,815,254 A    12/1957 Robert et al.
(Continued)

FOREIGN PATENT DOCUMENTS

WO    2007070476    6/2007

OTHER PUBLICATIONS

International Search Report for International Application No. PCT/US2022/021868 dated Jul. 8, 2022; 3 pages.
(Continued)

*Primary Examiner* — Thomas E Lazo
(74) *Attorney, Agent, or Firm* — CANTOR COLBURN LLP

(57) ABSTRACT

A manifold system that includes a gas cylinder assembly that includes an outer tube and a cylinder sleeve, and wherein atomized non-solid lubricant that flows into the cylinder sleeve of the gas cylinder assembly is used to at least partially or fully lubricate an inner surface of an interior chamber of the cylinder sleeve during the operation of the gas cylinder assembly.

32 Claims, 5 Drawing Sheets

(56) References Cited

U.S. PATENT DOCUMENTS

Figure 1:
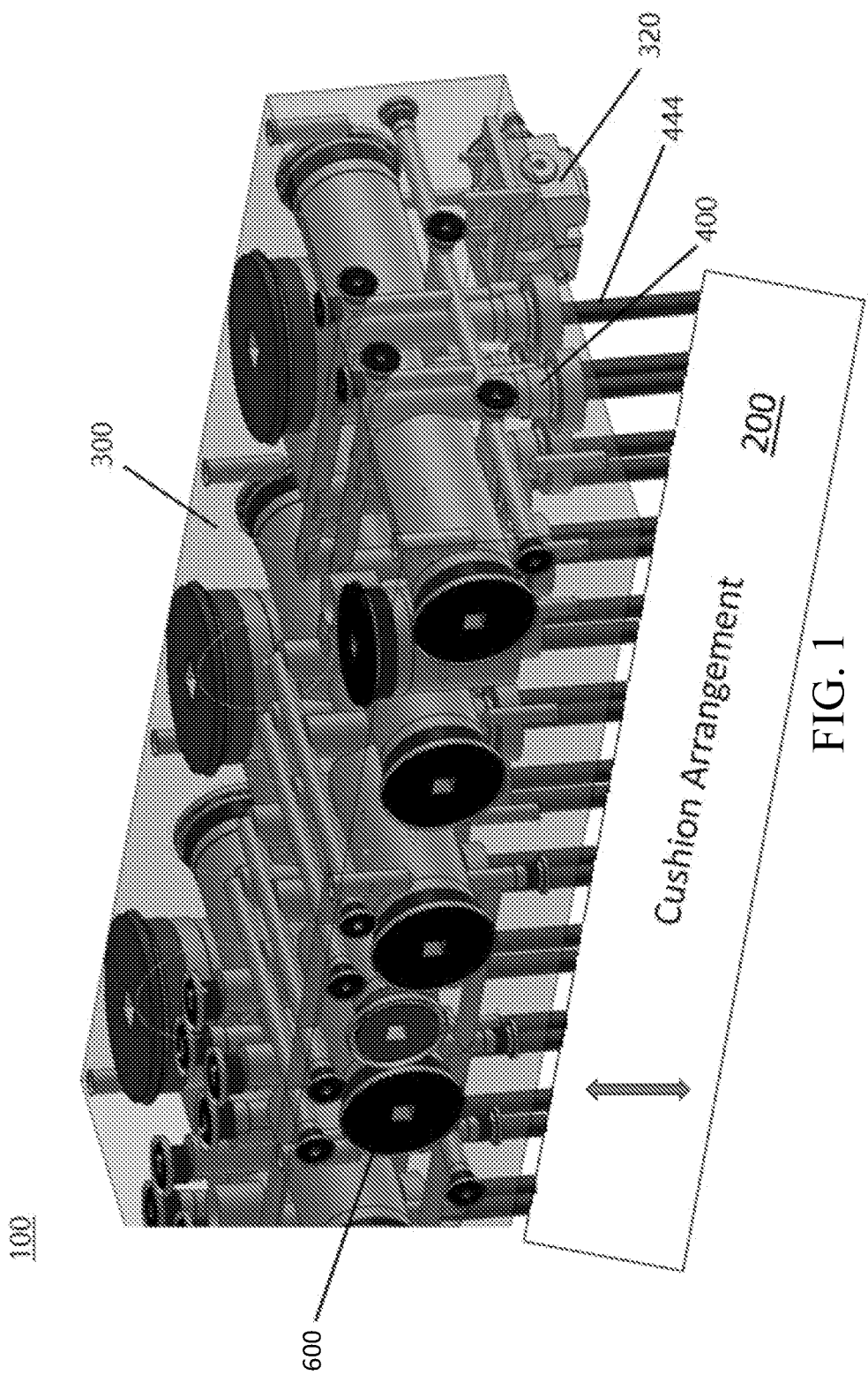

| | | | |
|---|---|---|---|
| 4,005,763 A | | 2/1977 | Wallis |
| 4,257,254 A | | 3/1981 | Adamus et al. |
| 4,342,448 A | | 8/1982 | Wallis |
| 4,688,775 A | * | 8/1987 | Kadis .................. F16N 7/36 |
| | | | 184/18 |
| 6,022,004 A | * | 2/2000 | Kelm ................. F16F 9/3278 |
| | | | 267/130 |
| 6,390,457 B1 | * | 5/2002 | Roper ..................... C08F 8/36 |
| | | | 188/282.1 |
| 6,499,383 B2 | * | 12/2002 | Shirakawa ........... F16N 39/002 |
| | | | 91/534 |
| 6,749,185 B1 | * | 6/2004 | Reilly .................... F16F 9/062 |
| | | | 188/269 |
| 7,707,866 B2 | * | 5/2010 | Lanterman .......... B22D 17/266 |
| | | | 72/453.01 |
| 11,110,506 B2 | | 9/2021 | Mclaughlin et al. |
| 2002/0014150 A1 | * | 2/2002 | Shirakawa ........... F16N 39/002 |
| | | | 92/61 |
| 2007/0151699 A1 | * | 7/2007 | Lanterman .......... B22D 17/266 |
| | | | 164/137 |

OTHER PUBLICATIONS

Written Opinion of the International Searching Authority for International Application No. PCT/US2022/021868 dated Jul. 8, 2022; 6 pages.

\* cited by examiner

TUBE IN TUBE LUBRICATION FOR A GAS CYLINDER

The present disclosure claims priority on U.S. Provisional Application Ser. No. 63/165,977 filed Mar. 25, 2021, which is fully incorporated herein by reference.

The present disclosure relates generally to gas cylinders, particularly to a gas cylinder assembly for use in pressing tools, and more particularly to a gas cylinder assembly for use in pressing tools that have a cylinder lubrication feature that at least partially or fully lubricates an inner surface of a cylinder of the gas cylinder assembly with atomized lubricant.

BACKGROUND OF DISCLOSURE

Gas cylinder assemblies have come to be widely used throughout industry. One example of use is in press or cushion assemblies intended for forming sheet-metal parts. Examples of such press or cushion assemblies are disclosed in U.S. Pat. Nos. 2,815,254; 4,005,763; 4,257,254; 4,342,448; and 11,110,506, which are fully incorporated by reference herein.

During of operation of the pressing or cushion assemblies, one or more of the components are lubricated to enhance the service life and reliability of the pressing or cushion assembly. For example, nitrogen manifold systems are designed with gas cylinder assemblies which dynamically cycle pistons. The pistons have high-pressure seals axially sliding in a metal sleeve. It has been historically shown that oil must be present on the high-pressure seals to allow for millions of cycles without failure of the high-pressure seals.

When the nitrogen manifold systems are mounted on the lower section of the pressing or cushion assemblies, any oil present in the gas cylinder assembly will collect at the lowest point in the gas cylinder assembly below the piston and sleeves. As the piston is moved toward the top of the cylinder sleeve of the gas cylinder, the piston forces nitrogen around the oil and cylinder sleeve. The nitrogen flow creates turbulence and moves the oil with the nitrogen to lubricate the cylinder sleeve. This setup for lower mounted nitrogen manifolds allows the piston to cycle for millions of strokes without degradation of performance.

In contrast, when a nitrogen manifold system is mounted on the moving ram of a press, such a setup inverts the cylinder rods and the oil does not collect at the bottom portion of the cylinder sleeve. Such a manifold setup is considered an upper mounting manifold setup. In such an arrangement, the piston with high-pressure seals axially slides on the inner surface of the cylinder sleeve that has little, if any, oil. Such dry cycling of the high-pressure seals will typically cause early failure or leakage of nitrogen.

Some prior art lubrication systems used for an upper manifold setup have the oil reservoir positioned on the manifold at a location that is above or below the bottom end of the cylinder in the cylinder assembly to feed the oil into the bottom portion of the cylinders. Such an arrangement results in the height of the manifold arrangement being increased to accommodate the oil reservoir. Also, this lubrication arrangement can require additional gas passageways to control the pressure differential in the cylinder assembly and lubrication arrangement. In some arrangements, a separate pump system that is spaced from the cylinders is required to pump the oil back to the oil reservoir.

In addition to the problems of properly lubricating upper mounting manifold setups, the oil location in the spring assembly after the final installation of the upper mounting manifold setup can be undesirable. The gas cylinder assemblies are commonly rotated in multiple directions during die building process and the location of the oil internally in the gas cylinder cylinders cannot be controlled. As such, the oil location after final installation of the gas cylinder assembly may result in at least some of the pre-inserted oil being located in an undesired location in the gas cylinder assembly, thus adversely affecting the operation and/or life of the gas cylinder assembly (e.g., oil located in gas passageways resulting in partial or full plugging of the gas passageways, the cylinder sleeve being overfilled with oil, little or no oil being located in the cylinder sleeve, etc.). For example, gas passageways, which are typically smaller than oil passageways, can become partially or fully plugged with oil and result in over-pressurization of the cylinder assembly which can result in damage or failure of the gas cylinder assembly and/or damages to other manifold components during the operation of the gas cylinder assembly. Also, if insufficient oil is located in the cylinder sleeve during operation, the seals can rapidly fail during operation of the gas cylinder assembly.

Additionally, traditional manifold designs call for a series of cylindrical drill openings that create small intersecting areas. These intersecting areas, while large enough for the flow of pressurized gas, can be highly restrictive to the flow of fluids. This is particularly true as the operating speeds of the gas cylinder increases. As such, the oil may be unable to or be restricted from timely flowing to an area of the gas cylinder that requires lubrication during the operation of the gas cylinder.

In view of the current state of the art of gas cylinder systems, there is a need for an improved lubrication arrangement for a gas cylinder system.

SUMMARY OF DISCLOSURE

The present disclosure provides a new and improved method and apparatus for lubricating components of a cylinder assembly that can be used in a manifold of a press or cushion assembly. However, it will be appreciated that the new and improved method and apparatus for lubricating components of a cylinder assembly can be used in other arrangements that include gas springs and/or gas cylinder assemblies.

The present disclosure relates to an improved lubrication system for an inverted or an upper mounting manifold setup wherein a mixture of atomized non-solid lubricant and gas is used to lubricant a gas cylinder assembly. As can be appreciated, a standard gas manifold (lower gas manifold) setup can also be used with the improved lubrication system. The atomization of the non-solid lubricant lubricates the high-pressure dynamic seals in the cylinders of the cylinder assembly to allow for an enhanced number (e.g., millions, etc.) of cycles without performance degradation of the cylinder assembly. The manifold in accordance with the present disclosure can be used in stamping presses to make parts in the automotive industry, manufacturing industry, medical field, etc.

During operation of the press or cushion assembly, the press or cushion assembly moves between an open position and closed position. During such operation, a piston on one or more cylinder assemblies moves axially in a cylinder sleeve of each of the cylinder assemblies, thereby creating a variable pressurized volume within each of the cylinder sleeves for a fluid. The diameter, length, and material of each of the cylinder sleeves are non-limiting. The cross-sectional shape or diameter, and the length of the interior chamber of each of the cylinder sleeves are non-limiting. The size, shape, length, and material of the piston are non-limiting other than the piston is configured to move within the interior chamber of the one or more cylinder sleeves. Each piston can optionally include a piston guide to guide the movement of the piston in the interior chamber of the cylinder sleeve. The size, shape, configuration, and material of the piston guide (when used) are non-limiting. Each of the pistons generally includes a sealing arrangement (e.g., elastomeric seal rings, flaps, etc.) to inhibit or prevent fluid from escaping the front-end of the interior chamber of the cylinder sleeve and/or other or additional regions of the interior chamber during the movement of the piston within the interior chamber of the cylinder sleeve. The front end of each of the pistons generally includes a piston rod that extends outwardly from the front end of the cylinder sleeve. Each of the cylinder assemblies can optionally include other components (e.g., gaskets, bushings, sensors, etc.). The number of strokes per minute of the piston moving between the retracted and extended piston positions within the interior chamber of each of the cylinder sleeves is non-limiting. In one non-limiting arrangement, the piston moves 1-100 strokes/minute (and all values and ranges therebetween). The fluid that flows into and out of the cylinder sleeve includes a gas and a lubricant. A portion or all of the lubricant in the fluid that flows into and out of the cylinder sleeve is atomized lubricant. The gas can be a nitrogen gas; however, other or additional gasses can be used. The lubricant is a non-solid lubricant that is in liquid form at a temperature of at least as low as 0° C. In one non-limiting arrangement, the non-solid lubricant has a viscosity of no more than 80 cSt@40° C. and more than 25 cSt@100° C. (ASTM D 445). One non-limiting example, the non-solid lubricant is a 2T oil; however, other or additional non-solid lubricants can be used.

As the one or more cylinder assemblies move to an extended piston position, the variable pressurized volume increases within each of the cylinder sleeves, and a flow of fluid moves from a fluid reservoir into each of the cylinder sleeves. The fluid that enters the cylinder sleeve includes atomized particles of lubricant wherein at least a portion or all of the atomization of the lubricant and the combining of the atomized lubricant with gas in the fluid occurred prior to such fluid entering the interior chamber of the cylinder sleeves. The atomized particles of lubricant partially or fully coat the inner surface of the interior chamber of the cylinder sleeves to thereby provide a lubrication coating on such surface. Such lubrication coating can be used to cool and/or lubricate one or more components of the piston and cylinder assembly (e.g., seals, piston guide, etc.). The lubrication coating can also optionally be used to facilitate in the formation of a gas seal between a portion of the piston and the inner surface of the interior chamber of the cylinder sleeves.

As the one or more cylinder assemblies move to a retracted piston position, the variable pressurized volume decreases within each of the cylinder sleeves, and a flow of fluid moves from the cylinder sleeves and into the fluid reservoir. The flow of fluid from the piston and cylinder assembly can include heat which may dissipated while the fluid in the fluid reservoir; however, this is not required. In one non-limiting arrangement, a portion of the press or cushion assembly is configured to push against the piston to move the piston to a retracted piston position after the piston has moved to the extended piston position; however, this is not required. Such arrangements are well known in the art and will not be further described herein. As can be appreciated, other arrangements can be used to move the one or more pistons of the gas cylinder assemblies to a retracted piston position.

The flow of fluid from the fluid reservoir to the one or more cylinder sleeves as the piston moves from the retracted piston position to the extended piston position is at least partially or fully caused by a pressure differential between the fluid reservoir and the expanding volume in the one or more cylinder sleeves. This pressure differential causes at least a portion of the fluid in the fluid reservoir to flow into the interior chamber of the one or more cylinder sleeves, thereby causing the non-solid lubricant in the fluid to be deposited on one or more portions of the inner wall of the interior chamber. As fluid flows into and/or out of the fluid reservoir, at least a portion of the non-solid lubricant that is not already atomized in the fluid reservoir, is atomized by the turbulence and/or pressure differential caused by the flow of fluid into and out of the fluid reservoir. In one non-limiting arrangement, most, if not all, (e.g., 51-100% and all values and ranges therebetween) of the non-solid lubricant in the fluid that flows into the interior chamber of the cylinder sleeve is atomized and mixed with a gas prior to flowing into the cylinder sleeves of the one or more gas cylinder assemblies. In other words, most, if not all, of the non-solid lubricant is atomized at a location remote to the one or more cylinder sleeves prior to the atomized non-solid lubricant flowing into the one or more cylinder sleeves.

In one non-limiting aspect of the present disclosure, there is provided a manifold system that includes one or more cylinder assemblies and a lubrication arrangement that overcome several of the deficiencies and limitations of prior art manifold system that included cylinder assemblies. The manifold that includes the cylinder assembly and lubrication arrangement in accordance with the present disclosure can be made shorter or more compact than prior art manifold assemblies and, thus, better address space and size issues for manifolds being assembled at different manufacturing facilities. The manifold that includes the cylinder assembly and lubrication arrangement in accordance with the present disclosure does not require separate mechanical pumps to ensure the proper flow and amounts of lubricant into and out of the cylinder assemblies during operation of the cylinder assemblies, thereby simplifying the design of the manifold that includes the cylinder assembly and lubrication arrangement, and/or reducing the number of parts that could fail during use of the cylinder assembly and lubrication arrangement. The manifold that includes the cylinder assembly and lubrication arrangement in accordance with the present disclosure does not require separate gas passageways from the passageways that include the lubricant, which were used in the prior systems to control the pressure differential in the cylinder assembly and reservoir that included the lubricant. The elimination of such additional gas passageways simplifies the manifold configuration and reduces the incidence of the clogging of these gas passageways.

In another non-limiting aspect of the present disclosure, the fluid reservoir which containing the fluid is generally in the manifold housing and is connected in fluid communication with the cylinder assemblies. The fluid reservoir is located remotely to the interior chamber of the cylinder assemblies of the one or more gas cylinder assemblies. As can be appreciated, the fluid reservoir can be located remotely from the manifold housing.

In another non-limiting aspect of the present disclosure, there is provided a manifold system that includes a manifold housing, a fluid reservoir that includes gas and optionally non-solid lubricant, and one or more gas cylinder assemblies. The shape, size, configuration, and material of the manifold housing are non-limiting. The fluid reservoir can be located remotely from the manifold housing or be positioned partially or fully in the manifold housing. The shape, size, configuration, and material of the fluid reservoir are non-limiting. Each of the gas cylinder assemblies includes a cylinder sleeve, an outer tube, and a piston. When two or more gas cylinder assemblies are included in the manifold housing, the cylinder sleeve of each of the gas cylinder assemblies is typically spaced from one another.

Each of the cylinder sleeves can be partially or fully supported and maintained in position by the manifold housing. The outer tube of each of the gas cylinder assemblies is configured such that at least a portion or all of an inner chamber of the outer tube optionally telescopically receives a bottom portion of the cylinder sleeve. The outer tube of each of the gas spring assemblies can be partially or fully supported and maintained in position by the manifold housing. As can be appreciated, the outer tube can optionally be eliminated and structures in the manifold housing can be formed to mimic or substitute for all or portions of the outer tube. As such, the outer tube can a) be a fully separate component from the manifold housing, b) be partially formed by a component separate from the manifold housing and be partially formed by the manifold housing, or c) be fully formed by the manifold housing. In one non-limiting arrangement, a manifold sleeve cavity is formed in the manifold housing which is configured to partially or fully receive the cylinder sleeve, and a manifold tube cavity is formed in the manifold housing which is configured to partially or fully receive the outer tube. In one non-limiting arrangement, a top portion of the cylinder sleeve is at least partially or fully supported in the manifold sleeve cavity and a bottom portion of the cylinder sleeve is partially or fully spaced from the manifold housing. In another non-limiting arrangement, a top portion of the outer tube is at least partially or fully supported in the manifold tube cavity and bottom portion of the outer tube is partially or fully spaced from the manifold housing. At least a portion or all of an inner surface of the inner chamber of the outer tube is optionally spaced from at least a portion or all of an outer surface of the cylinder sleeve to form a cylinder fluid gap. The cylinder fluid gap is configured to enable fluid flow through the cylinder fluid gap as said piston axially moves between extended and retracted piston positions within the interior chamber of the cylinder sleeve. Generally, at least a portion or all of an inner surface of the inner chamber of the outer tube is optionally spaced from at least a portion or all of the outer surface of the bottom portion of the cylinder sleeve to form a cylinder fluid gap. The cylinder fluid gap is configured to allow fluid flow between the cylinder fluid gap and the interior chamber of the cylinder sleeve. A portion of an outer surface of the bottom portion of the outer tube is spaced from an inner surface of the manifold housing to form a tube fluid gap. At least a portion or all of a bottom end of said outer tube is spaced from the manifold housing to form a bottom fluid gap that is configured to allow fluid flow between the cylinder fluid gap and the tube fluid gap as the piston rod axially moves between the extended and retracted piston positions within the interior chamber of the cylinder sleeve. As can be appreciated, other or additional arrangements can be used to enable fluid flow into and/or out of the interior cavity of the cylinder sleeve during the movement of the piston in the interior cavity of the cylinder sleeve (e.g., one or more openings in the side wall of the cylinder sleeve, one or more slots in a top and/or side wall of the cylinder sleeve, etc.).

At least a portion or all of the bottom fluid gap includes the non-solid lubricant prior to the operation of the one or more gas cylinder assemblies. At least a portion of the cylinder fluid gap and/or the tube fluid gap can also optionally include non-solid lubricant prior to the operation of the one or more gas cylinder assemblies. In one non-limiting embodiment, prior to the operation of the one or more gas cylinder assemblies, the fluid level of the non-solid lubricant in the bottom fluid gap is such that the fluid level is below the bottom end of the outer tube. In another non-limiting embodiment, prior to the operation of the one or more gas cylinder assemblies the fluid level of the non-solid lubricant in the bottom fluid gap is such that the fluid level is above the bottom end of the outer tube, and the non-solid lubricant fills a portion of the cylinder fluid gap and/or tube fluid gap. In one specific arrangement, prior to the operation of the one or more gas cylinder assemblies, the fluid level of the non-solid lubricant is such that a) the bottom fluid gap is fully filled with non-solid lubricant, b) the fluid level of the non-solid lubricant is such that the bottom end of the outer tube is submerged in the non-solid lubricant, c) the level of the non-solid lubricant in the tube fluid gap is such the non-solid lubricant optionally covers 0.001-40% (and all values and ranges therebetween) of a longitudinal length of the outer surface of the outer tube that forms at least a portion of the tube fluid gap, d) the level of the non-solid lubricant in the cylinder fluid gap is such that the non-solid lubricant optionally covers 0.001-40% (and all values and ranges therebetween) of a longitudinal length of the inner surface of the outer tube that forms at least a portion of the cylinder fluid gap, and e) the level of the non-solid lubricant in the cylinder fluid gap is such that the non-solid lubricant optionally covers 0.001-40% (and all values and ranges therebetween) of a longitudinal length of the outer surface of the cylinder sleeve that forms at least a portion of the cylinder fluid gap. In another specific arrangement, prior to the operation of the one or more gas cylinder assemblies, the fluid level of the non-solid lubricant is such that a) the bottom fluid gap is fully filled with non-solid lubricant, b) the fluid level of the non-solid lubricant is such that the bottom end of the outer tube is submerged in the non-solid lubricant, c) the level of the non-solid lubricant in the tube fluid gap is such that the non-solid lubricant optionally covers 1-15% of a longitudinal length of the outer surface of the outer tube that forms at least a portion of the tube fluid gap, d) the level of the non-solid lubricant in the cylinder fluid gap is such that the non-solid lubricant optionally covers 1-15% of a longitudinal length of the inner surface of the outer tube that forms at least a portion of the cylinder fluid gap, and e) the level of the non-solid lubricant in the cylinder fluid gap is such that the non-solid lubricant optionally covers 1-15% of a longitudinal length of the outer surface of the cylinder sleeve that forms at least a portion of the cylinder fluid gap.

The manifold system in accordance with the present disclosure provides an upper gas manifold with an innovative design to lubricate the pressure seals in the one or more gas cylinder assemblies. The manifold system in accordance with the present disclosure is configured to allow lubricant to be inserted into the manifold housing and/or gas cylinder assemblies prior to the manifold being installed in the press or cushion assembly. Thus, the manifold system can be stored in the lower mounting manifold position prior to the manifold system being mounted in position in the press or cushion assembly in an upper mounting manifold. Such reorientation of the manifold system will not adversely affect the location of the lubricant in the manifold and/or gas cylinder assemblies. The manifold system in accordance with the present disclosure allows for the lubricant to be inserted into the manifold and/or gas cylinder assemblies while the manifold assembly is in any orientation prior to final installation. When the manifold system is finally oriented in the upper mounting manifold position wherein the rods on the piston of the gas cylinder assemblies are oriented in a downward position, some or all lubricant will move by gravity to the lowest point in the gas cylinder assembly and manifold structures about the gas cylinder assemblies, thereby causing some or all of the lubricant to be at or in close proximity to the bottom end of the outer tube. When the piston in the gas cylinder assembly is initially moved to the retracted piston position, the gas pressure in the cylinder sleeve increases and the gas from the interior cavity of the cylinder sleeve moves out of the cylinder sleeve and through the cylinder fluid gap formed between the cylinder sleeve and the outer tube. If large volumes of non-solid lubricant are located in the cylinder chamber of the cylinder sleeve of one or more of the gas cylinder assemblies at the time of startup and the piston is moved to the retracted position, 0.01-100% (and all values and ranges therebetween) of the non-solid lubricant in the cylinder chamber of the cylinder sleeve of one or more of the gas cylinder assemblies is caused to flow into the cylinder fluid gap, thereby minimizing or preventing damage to the gas cylinder assemblies that could arise from the desired flow of fluid between the fluid reservoir and the one or more of the gas cylinder assemblies during operation of the gas cylinder assemblies.

As the fluid (e.g., gas, a mixture of gas and non-solid lubricant, etc.) flows through the cylinder fluid gap and past the bottom fluid gap and into the tube fluid gap, the fluid passes over and/or through the non-solid lubricant that is positioned in the bottom fluid gap and optionally also positioned in the bottom portion of the cylinder fluid gap and/or the tube fluid gap, the turbulent interaction of the fluid with the non-solid lubricant causes at least a portion of the non-solid lubricant to atomize and be dispersed in the fluid. Such disbursement of the atomized non-solid lubricant in the fluid can optionally form an emulsion of gas and non-solid lubricant. All or a portion of the atomized non-solid lubricant can be retained in the bottom fluid gap, the tube fluid gap, and/or the cylinder fluid gap until the piston begins moving to the extended piston position. When the piston moves to the extended piston position, fluid will flow from the tube fluid gap, through the bottom fluid gap, through the cylinder fluid gap, and into the interior cavity of the cylinder sleeve. As at least a portion of the fluid again passes over and/or through any non-solid lubricant that has not already been atomized and combined in the fluid, the turbulent interaction of the fluid with the non-solid lubricant will again cause at least a portion of the non-solid lubricant to atomize and be dispersed in the fluid. The atomized lubricant in the fluid will be carried into the interior cavity of the cylinder sleeve and lubricates a portion or all of the inner surface of the interior cavity of the cylinder sleeve. This lubrication process occurs for every cycle of the piston in the gas cylinder assembly.

During initial start-up of the press or cushion assembly, little or no lubricant may be coating various portions of the inner surface of the interior chamber of the cylinder sleeve of one or more of the cylinder assemblies. Also, most, if not all, of the non-solid lubricant is located in the bottom fluid gap, and most, if not all, of the non-solid lubricant is separated from the gas that is located in the bottom fluid gap, cylinder fluid gap, and the tube fluid gap. Once the press or cushion assembly begins operation, the first few strokes of the piston within each of the cylinder sleeves may encounter little amounts of lubricant on the inner surface of the interior chamber of the cylinder sleeve. However, after one or more strokes of the piston, the interaction of the gas with the non-solid lubricant in the bottom fluid gap, and optionally in the cylinder fluid gap, and/or the tube fluid gap causes atomization of at least a portion or all of the non-solid lubricant in the bottom fluid gap, and optionally in the cylinder fluid gap and/or the tube fluid gap. The atomized non-solid lubricant can optionally form an emulsion with the gas. The operation of the press or cushion assembly can result in 2100% (and all values and ranges therebetween) of the non-solid lubricant in the bottom fluid gap, and optionally in the cylinder fluid gap and/or the tube fluid gap to be eventually atomized and form a mixture (e.g., emulation, etc.) with the gas. In one non-limiting arrangement, 10100% of the non-solid lubricant in the bottom fluid gap, and optionally in the cylinder fluid gap, and/or the tube fluid gap is eventually atomized and forms a mixture with the gas. In another non-limiting arrangement, 20100% of the non-solid lubricant in the bottom fluid gap, and optionally in the cylinder fluid gap, and/or the tube fluid gap is eventually atomized and forms a mixture with the gas. In another non-limiting arrangement, 30-100% of the non-solid lubricant in the bottom fluid gap, and optionally in the cylinder fluid gap, and/or the tube fluid gap is eventually atomized and forms a mixture with the gas in the fluid. Once at least a portion or all of the non-solid lubricant is atomized and combines or mixes with the gas that is flowing into and/or through the bottom fluid gap, the cylinder fluid gap, and the tube fluid gap, the atomized non-solid lubricant is transported to the inner surface of the interior chamber of the cylinder sleeve to apply lubricant to at least a portion or all of the inner surface of the interior chamber of the cylinder sleeve as the piston moves within the interior chamber of the cylinder sleeve. Thereafter, further operation of the press or cushion assembly has the inner surface of the interior chamber of the cylinder sleeve lubricated as the piston moves within the interior chamber of the cylinder sleeve. In such a novel lubrication arrangement, a separate pump is not required to supply lubricant to the interior chamber of the cylinder sleeve. The differential pressure in the interior chamber of the cylinder sleeve as the piston moves within the interior chamber of the cylinder sleeve causes the gas to flow into and/or through the bottom fluid gap, the cylinder fluid gap, and the tube fluid gap. Generally, the atomized non-solid lubricant remains as a mixture (e.g., emulation) with the gas during the operation of the one or more gas cylinder assemblies. Generally, 20-100% (and all values and ranges therebetween) of the atomized non-solid lubricant remains as a mixture with the gas as the fluid including the gas and atomized non-solid lubricant flows into and out of the one or more gas cylinder assemblies. The number of strokes of the piston to cause atomization of the non-solid lubricant and thereafter begin lubrication of the inner surface of the interior chamber of the cylinder sleeve with such atomized non-solid lubricant is non-limiting. In one non-limiting example, a cylinder assembly that operates at pressures between 300-2000 psi (and all values and ranges therebetween) and wherein the piston strokes at 10-100 strokes per minute (and all values and ranges therebetween), generally has atomized 0.1-100% (and all values and ranges therebetween) of the non-solid lubricant in the bottom fluid gap, and optionally in the cylinder fluid gap, and/or the tube fluid gap, has atomized non-solid lubricant at least partially or fully lubricating the inner surface of the interior chamber of the cylinder sleeve within less than 10 minutes (e.g., 0.01-10 minutes and all values and ranges therebetween).

In another non-limiting aspect of the present disclosure, there is provided a manifold system that includes a fluid reservoir that includes gas and non-solid lubricant, and one or more gas cylinder assemblies. The fluid reservoir, when positioned in the manifold housing, can optionally be positioned relative to the cylinder sleeve of one or more or all of the cylinder assemblies such that at least a portion or all (5-100% and all values and ranges therebetween) of the fluid reservoir is located between a top end and bottom end of the cylinder sleeve of one or more or all of the cylinder assemblies. In one non-limiting embodiment, at least 50% of the fluid reservoir is located between a top end and bottom end of the cylinder sleeve of one or more or all of the cylinder assemblies. In another non-limiting embodiment, 100% of the fluid reservoir is located between a top end and bottom end of the cylinder sleeve of all of the cylinder assemblies. The positioning of a portion or all of the fluid reservoir partially or fully between the top and bottom ends of the cylinder sleeve of all of the gas cylinder assemblies facilitate in the reduction of the size and/or volume of the manifold system.

In another non-limiting aspect of the present disclosure, the fluid reservoir that is at least partially positioned in the manifold housing is in direct fluid communication with the tube fluid gap and/or the bottom fluid gap. In such an arrangement, no separate passageways exist between the tube fluid gap and/or the bottom fluid gap. In one non-limiting embodiment, the same manifold housing wall that forms a portion of the fluid reservoir also forms the manifold wall for the tube fluid gap. In one non-limiting arrangement, a portion of the gas cylinder assembly extends through a portion of the fluid reservoir such that the manifold side walls that form the fluid reservoir also form the manifold wall of the tube fluid gap and the bottom fluid gap. In such an arrangement, the top and bottom ends of both the tube fluid gap and the cylinder fluid gap are located within the cavity of the fluid reservoir, and the bottom fluid gap is also located in within the cavity of the fluid reservoir. In such an arrangement, the fluid level of the non-solid lubricant in the fluid reservoir directly affects the fluid level of the non-solid lubricant in the bottom fluid gap, the tube fluid gap, and/or the bottom fluid gap. In another non-limiting arrangement, a portion of the gas cylinder assembly extends through a portion of the fluid reservoir such that the manifold side walls that form the fluid reservoir also forms 5-100% (and all values and ranges therebetween) of the manifold wall of the tube fluid gap and/or forms 5-100% (and all values and ranges therebetween) of the manifold wall of the bottom fluid gap.

In one non-limiting object of the present disclosure, there is provided a new and improved press or cushion assembly that includes an improved lubrication arrangement for one or more gas cylinder assemblies used in the press or cushion assembly.

In another and/or alternative non-limiting object of the present disclosure, there is provided a new and improved press or cushion assembly that includes an improved lubrication arrangement for one or more gas cylinder assemblies used in the press or cushion assembly and which can optionally be smaller and/or shorter than prior art press or cushion assemblies having the same sized gas cylinder assemblies.

In another and/or alternative non-limiting object of the present disclosure, there is provided a manifold system that can optionally be used in a press or cushion assembly, wherein the manifold system includes a manifold housing, a fluid reservoir, a gas cylinder assembly that is fluidly connected to the fluid reservoir, and wherein atomized non-solid lubricant that flows into a cylinder sleeve of the gas cylinder assembly is used to at least partially or fully lubricate an inner surface of an interior chamber of the cylinder sleeve during the operation of the gas cylinder assembly.

In another and/or alternative non-limiting object of the present disclosure, there is provided a gas cylinder assembly comprising a cylinder sleeve configured to be supported in a first cavity of a housing, an outer tube configured to be supported in a second cavity of a housing, a piston, and a non-solid lubricant. The housing can be a manifold housing; however, other arrangement can be used to support the cylinder sleeve and/or the outer tube. The cylinder sleeve includes an interior chamber wherein the piston axially moves between extended and retracted piston positions within the interior chamber of the cylinder sleeve. A bottom portion of the cylinder sleeve is optionally telescopically positioned in at least a portion of an inner chamber of the outer tube. As can be appreciated, the bottom portion of the cylinder sleeve can alternatively be fully or partially vertically spaced from the outer tube. At least a portion or all of an inner surface of the outer tube is spaced from at least a portion or all of an outer surface of the cylinder sleeve to form a cylinder fluid gap. The cylinder fluid gap is configured to enable fluid to flow through the cylinder fluid gap as the piston axially moves between extended and retracted piston positions within the interior chamber of the cylinder sleeve. In one non-limiting arrangement, 20-95% (and all values and ranges therebetween) of the longitudinal length of the inner surface of the side wall of the outer tube faces the outer surface of a portion of the side wall of the cylinder sleeve. In another non-limiting arrangement, 55-95% of the longitudinal length of the inner surface of the side wall of the outer tube faces the outer surface of a portion the side wall of the cylinder sleeve. In another non-limiting arrangement, 20-95% (and all values and ranges therebetween) of the longitudinal length of the outer surface of the side wall of the cylinder sleeve faces the inner surface of the side wall of the outer tube. In another non-limiting arrangement, 30-80% of the longitudinal length of the outer surface of the side wall of the cylinder sleeve faces the inner surface of the side wall of the outer tube. In another non-limiting arrangement, the percent of the longitudinal length of the outer surface of the side wall of the cylinder sleeve that faces the inner surface of the side wall of the outer tube is less than the percent of the longitudinal length of the inner surface of the side wall of the outer tube that faces the outer surface of a portion of the side wall of the cylinder sleeve. In another non-limiting arrangement, the piston is spaced from the outer tube as the piston axially moves between extended and retracted piston positions within the interior chamber of the cylinder sleeve. At least a portion or all of a bottom end of the cylinder sleeve is spaced from an interior surface of the inner chamber of the outer tube. At least a portion of an outer surface of the outer tube is spaced from at least a portion of an inner surface of a wall of the manifold housing to form a tube fluid gap. The tube fluid gap is configured to enable fluid flow into and out of the tube fluid gap as the piston axially moves between the extended and retracted piston positions within the interior chamber of the cylinder sleeve. At least a portion of a bottom end of the outer tube is spaced from the manifold housing to form a bottom fluid gap. The bottom fluid gap is configured to enable fluid flow between the cylinder fluid gap and the tube fluid gap as the piston axially moves between the extended and retracted piston positions within the interior chamber of the cylinder sleeve. At least a portion of the bottom fluid gap optionally includes non-solid lubricant.

In another and/or alternative non-limiting object of the present disclosure, there is provided a gas cylinder assembly wherein the piston includes a seal arrangement configured to inhibit fluid from flowing out a top end of the cylinder sleeve as the piston axially moves between extended and retracted piston positions within the interior chamber of the cylinder sleeve.

In another and/or alternative non-limiting object of the present disclosure, there is provided a gas cylinder assembly wherein a fluid level of the non-solid lubricant in the bottom fluid gap is such that the bottom end of the outer tube is submerged in the non-solid lubricant prior to the initial movement of the piston between the extended and retracted piston positions within the interior chamber of the cylinder sleeve. The fluid level of the non-solid lubricant in the bottom fluid gap can also be such that the bottom end of the outer tube remains submerged in the non-solid lubricant after the initial movement of the piston between the extended and retracted piston positions within the interior chamber of the cylinder sleeve.

In another and/or alternative non-limiting object of the present disclosure, there is provided a gas cylinder assembly wherein at least a portion of the bottom fluid gap, the cylinder fluid gap, and/or the tube fluid gap includes non-solid lubricant. Generally, prior to the initial operation of the one or more gas cylinder assemblies, lubricant in a non-atomized state is located in the bottom fluid gap, the cylinder fluid gap, and/or the tube fluid gap.

In another and/or alternative non-limiting object of the present disclosure, there is provided a gas cylinder assembly wherein the bottom fluid gap and/or the tube fluid gap is in direct fluid communication with the fluid reservoir. In one non-limiting arrangement at least a portion of the bottom fluid gap and/or the tube fluid gap is formed by a wall of the fluid reservoir.

In another and/or alternative non-limiting object of the present disclosure, there is provided a gas cylinder assembly wherein the piston includes a seal arrangement configured to inhibit fluid from flowing out a top end of the cylinder sleeve as the piston axially moves between the extended and retracted piston positions within the interior chamber of the cylinder sleeve.

In another and/or alternative non-limiting object of the present disclosure, there is provided a gas cylinder assembly wherein a fluid level of the non-solid lubricant in the bottom fluid gap is such that the bottom end of the outer tube is submerged in the non-solid lubricant.

In another and/or alternative non-limiting object of the present disclosure, there is provided a gas cylinder assembly wherein a minimum cross-sectional area of the cylinder fluid gap is at least 25% than an average cross-sectional area of the interior chamber of the cylinder sleeve. By appropriately configuring the cross-sectional area of the cylinder fluid gap, little or no impairment of fluid flow from the interior chamber of the cylinder sleeve to the cylinder fluid gap occurs as the piston moves from the extended piston position to the retracted piston position. In one particular arrangement, the minimum cross-sectional area of the cylinder fluid gap along 5-100% (and all values and ranges therebetween) of the longitudinal length of the cylinder fluid gap is 25-200% (and all values and ranges therebetween) the cross-sectional area of the opening in the interior chamber at the bottom end of the interior chamber of the cylinder sleeve. In another particular arrangement, the minimum cross-sectional area of the cylinder fluid gap along 50-100% of the longitudinal length of the cylinder fluid gap is 40-150% the cross-sectional area of the opening in the interior chamber at the bottom end of the interior chamber of the cylinder sleeve. In another particular arrangement, the minimum cross-sectional area of the cylinder fluid gap along 75-100% of the longitudinal length of the cylinder fluid gap is 50-100% the cross-sectional area of the opening in the interior chamber at the bottom end of the interior chamber of the cylinder sleeve. The cross-sectional area of the cylinder fluid gap can be constant or vary along the longitudinal length of the cylinder fluid gap.

In another and/or alternative non-limiting object of the present disclosure, there is provided a gas cylinder assembly wherein a volume of the cylinder fluid gap is at least 20% a volume of the interior chamber of the cylinder sleeve. The volume of the cylinder fluid gap can be selected so as to not impair the flow of fluid from the interior chamber of the cylinder sleeve into the cylinder fluid gap as the piston moves from the extended piston position to the retracted piston position. In one particular arrangement, the volume of the cylinder fluid gap 20-200% (and all values and ranges therebetween) the volume of the interior chamber of the cylinder sleeve. In another particular arrangement, the volume of the cylinder fluid gap is 30-150% of the interior chamber of the cylinder sleeve. In another particular arrangement, the volume of the cylinder fluid gap is 40-100% the volume of the cylinder sleeve.

In another and/or alternative non-limiting object of the present disclosure, there is provided a gas cylinder assembly wherein a minimum cross-sectional area of the tube fluid gap is at least 25% than an average cross-sectional area of the interior chamber of the cylinder sleeve. By appropriately configuring the cross-sectional area of the tube fluid gap, impairment of fluid flow from the interior chamber of the cylinder sleeve to the tube fluid gap can at least partially minimized as the piston moves from the extended piston position to the retracted piston position. In one particular arrangement, the minimum cross-sectional area of the tube fluid gap along 5-100% (and all values and ranges therebetween) of the longitudinal length of the tube fluid gap is 25-200% (and all values and ranges therebetween) the cross-sectional area of the opening in the interior chamber at the bottom end of the interior chamber of the cylinder sleeve. In another particular arrangement, the minimum cross-sectional area of the tube fluid gap along 50-100% of the longitudinal length of the tube fluid gap is 40-150% the cross-sectional area of the opening in the interior chamber at the bottom end of the interior chamber of the cylinder sleeve. In another particular arrangement, the minimum cross-sectional area of the tube fluid gap along 75-100% of the longitudinal length of the tube fluid gap is 50-100% the cross-sectional area of the opening in the interior chamber at the bottom end of the interior chamber of the cylinder sleeve. The cross-sectional area of the tube fluid gap can be constant or vary along the longitudinal length of the tube fluid gap.

In another and/or alternative non-limiting object of the present disclosure, there is provided a gas cylinder assembly wherein a minimum cross-sectional area of the bottom fluid gap is at least 25% than an average cross-sectional area of the interior chamber of the cylinder sleeve. By appropriately configuring the cross-sectional area of the bottom fluid gap, impairment of fluid flow from the interior chamber of the cylinder sleeve and through the bottom fluid gap can at least partially minimized as the piston moves from the extended piston position to the retracted piston position. In one particular arrangement, the minimum cross-sectional area of the bottom fluid gap along 5-100% (and all values and ranges therebetween) of the longitudinal length of the bottom fluid gap is 25-200% (and all values and ranges therebetween) the cross-sectional area of the opening in the interior chamber at the bottom end of the interior chamber of the cylinder sleeve. In another particular arrangement, the minimum cross-sectional area of the bottom fluid gap along 50-100% of the longitudinal length of the bottom fluid gap is 40-150% the cross-sectional area of the opening in the interior chamber at the bottom end of the interior chamber of the cylinder sleeve. In another particular arrangement, the minimum cross-sectional area of the tube fluid gap along 75-100% of the longitudinal length of the bottom fluid gap is 50-100% the cross-sectional area of the opening in the interior chamber at the bottom end of the interior chamber of the cylinder sleeve. The cross-sectional area of the tube fluid gap can be constant or vary along the longitudinal length of the tube fluid gap.

In another and/or alternative non-limiting object of the present disclosure, there is provided a manifold system that includes a) a manifold housing, b) a fluid reservoir that includes fluid, and c) a first gas cylinder assembly. The first gas cylinder assembly includes a cylinder sleeve supported in a first cylinder cavity in the manifold housing, an outer tube that is configured to be supported in a first tube cavity in the manifold housing, and a piston. The cylinder sleeve includes an interior chamber wherein the piston axially moves between extended and retracted piston positions within the interior chamber of the cylinder sleeve. A bottom portion of the cylinder sleeve is telescopically positioned in at least a portion of an inner chamber of the outer tube. At least a portion of an inner surface of the outer tube is spaced from at least a portion of an outer surface of the cylinder sleeve to form a cylinder fluid gap configured to allow fluid flow through the cylinder fluid gap as the piston axially moves between the extended and retracted piston positions within the interior chamber. At least a portion of a bottom end of the cylinder sleeve is spaced from an interior surface of the inner chamber of the outer tube to allow fluid flow between the cylinder fluid gap and the interior chamber of the cylinder sleeve. At least a portion of an outer surface of the outer tube is spaced from at least a portion of an inner surface of the manifold housing to form a tube fluid gap that is configured to allow fluid flow into and out of the tube fluid gap as the piston axially moves between the extended and retracted piston positions within the interior chamber of the cylinder sleeve. At least a portion of a bottom end of the outer tube is spaced from the manifold housing to form a bottom fluid gap that is configured to allow fluid flow between the cylinder fluid gap and the tube fluid gap as the piston axially moves between the extended and retracted piston positions within the interior chamber of the cylinder sleeve. At least a portion or all of said bottom fluid gap is optionally filled with non-solid lubricant. The fluid reservoir is typically located remotely from the first gas cylinder assembly. At least a portion of the fluid optionally flows from the fluid reservoir to the cylinder sleeve as the piston moves toward a top end of the cylinder sleeve. At least a portion of the fluid optionally flows from the fluid reservoir to the cylinder sleeve as the piston moves toward a top end of the cylinder sleeve. The fluid that enters into the interior chamber of the cylinder sleeve includes atomized non-solid lubricant that at least partially lubricates an inner surface of the interior chamber of the cylinder sleeve as the piston moves toward the top end of the cylinder sleeve. The fluid reservoir is optionally located in the manifold housing; the fluid reservoir is positioned relative to the cylinder sleeve such that at least a portion of the fluid reservoir is located between the top and bottom ends of the cylinder sleeve. A fluid level of the non-solid lubricant in the fluid reservoir prior to operation of the first gas cylinder assembly is such that a bottom end of the outer tube is optionally submerged in the non-solid lubricant.

In another and/or alternative non-limiting object of the present disclosure, there is provided a manifold system wherein the flow of the non-solid lubricant into and out of the cylinder sleeve is at least partially caused by axial movement of the piston in the cylinder sleeve and without use of a fluid pump.

In another and/or alternative non-limiting object of the present disclosure, there is provided a manifold system that further includes a second gas cylinder assembly that is similar to the first gas cylinder assembly. The second gas cylinder assembly is positioned adjacent to and spaced from the first gas cylinder assembly. At least a portion of the fluid flows from the cylinder sleeve of the second gas cylinder assembly optionally flows into the fluid reservoir as the piston moves toward a bottom end of the cylinder sleeve of the second gas cylinder assembly. At least a portion of the fluid optionally flows from the fluid reservoir to the cylinder sleeve of the second gas cylinder assembly as the piston moves toward a top end of the cylinder sleeve of the second gas cylinder assembly. The fluid that enters into the interior chamber of the cylinder sleeve of the second gas cylinder assembly includes atomized non-solid lubricant that at least partially lubricates an inner surface of the interior chamber of the cylinder sleeve of the second gas cylinder assembly as the piston moves toward the top end of the cylinder sleeve of the second gas cylinder assembly.

In another and/or alternative non-limiting object of the present disclosure, there is provided a method for lubrication of a gas cylinder assembly that comprises providing a cylinder assembly including a cylinder sleeve configured to be supported in a first cavity of a manifold housing, an outer tube configured to be supported in a second cavity of a manifold housing, a piston, and a non-solid lubricant.

The cylinder sleeve includes an interior chamber wherein the piston axially moves between extended and retracted piston positions within the interior chamber of the cylinder sleeve. A bottom portion of the cylinder sleeve is telescopically positioned in at least a portion of an inner chamber of the outer tube. At least a portion of an inner surface of the outer tube is spaced from at least a portion of an outer surface of the cylinder sleeve to form a cylinder fluid gap that is configured to allow fluid flow through the cylinder fluid gap as the piston axially moves between the extended and retracted piston positions within the interior chamber of the cylinder sleeve. At least a portion of a bottom end of the cylinder sleeve is spaced from an interior surface of the inner chamber of the outer tube to allow fluid flow between the cylinder fluid gap and the interior chamber of the cylinder sleeve. At least a portion of an outer surface of the outer tube is spaced from at least a portion of an inner surface of the manifold housing to form a tube fluid gap that is configured to allow fluid flow into and out of the tube fluid gap as the piston axially moves between the extended and retracted piston positions within the interior chamber of the cylinder sleeve. At least a portion of a bottom end of the outer tube is spaced from the manifold housing to form a bottom fluid gap that is configured to allow fluid flow between the cylinder fluid gap and the tube fluid gap as the piston axially moves between the extended and retracted piston positions within the interior chamber of the cylinder sleeve. At least a portion of the bottom fluid gap includes the non-solid lubricant. The method further includes moving the piston from the retracted piston position to the extended piston position to cause fluid to flow from the tube fluid gap, into and through the bottom fluid gap, into and through the cylinder fluid gap, and then into the interior chamber of the cylinder sleeve. The fluid that passes into and through the bottom fluid gap at least partially interacts with non-solid lubricant in the bottom fluid gap to thereby cause at least a portion of the non-solid lubricant to become atomized and mixed with fluid and then be conveyed into the interior chamber of the cylinder sleeve as the fluid passes into and through the cylinder fluid gap and into the interior chamber of the cylinder sleeve. The atomized non-solid lubricant that enters into the interior chamber of the cylinder sleeve at least partially or fully lubricates an inner surface of the interior chamber of the cylinder sleeve.

In another and/or alternative non-limiting object of the present disclosure, there is provided a molding or stamping system comprising a) a molding or stamping arrangement that is configured to cause a material to be molded, shaped, and/or stamped; and b) a manifold system that includes a cylinder assembly, and wherein the cylinder assembly is configured to move one or more components of the molding or stamping arrangement to cause the material to be molded, shaped, and/or stamped. The manifold system includes i) a manifold housing, ii) a fluid reservoir that includes fluid, and iii) a first gas cylinder assembly including cylinder sleeve configured to be supported in a first cavity of a manifold housing, an outer tube configured to be supported in a second cavity of a manifold housing, a piston, and a non-solid lubricant. The cylinder sleeve includes an interior chamber wherein the piston axially moves between extended and retracted piston positions within the interior chamber of the cylinder sleeve. A bottom portion of the cylinder sleeve is telescopically positioned in at least a portion of an inner chamber of the outer tube. At least a portion of an inner surface of the outer tube is spaced from at least a portion of an outer surface of the cylinder sleeve to form a cylinder fluid gap that is configured to allow fluid flow through the cylinder fluid gap as the piston axially moves between the extended and retracted piston positions within the interior chamber. At least a portion of a bottom end of the cylinder sleeve is spaced from an interior surface of the inner chamber of the outer tube to allow fluid flow between the cylinder fluid gap and the interior chamber of the cylinder sleeve. At least a portion of an outer surface of the outer tube is spaced from at least a portion of an inner surface of the manifold housing to form a tube fluid gap that is configured to allow fluid flow into and out of the tube fluid gap as the piston axially moves between the extended and retracted piston positions within the interior chamber of the cylinder sleeve. At least a portion of a bottom end of the outer tube is spaced from the manifold housing to form a bottom fluid gap that is configured to allow fluid flow between the cylinder fluid gap and the tube fluid gap as the piston axially moves between the extended and retracted piston positions within the interior chamber of the cylinder sleeve. At least a portion or all of the bottom fluid gap optionally includes non-solid lubricant. The fluid that flows from the tube fluid gap, through the bottom fluid gap, and then through the cylinder fluid gap interacts with the non-solid lubricant in the tube fluid gap to cause at least a portion of the non-solid lubricant to atomize and then flow with the fluid to the cylinder sleeve. The atomized non-solid lubricant at least partially or fully lubricates an inner surface of the interior chamber of the cylinder sleeve as the piston moves toward the top end of the cylinder sleeve.

These and other advantages will become apparent to those skilled in the art upon the reading and following of this description.

BRIEF DESCRIPTION OF THE DRAWINGS

Reference may now be made to the drawings, which illustrate various embodiments that the disclosure may take in physical form and in certain parts and arrangement of parts wherein:

FIG. 1 is a sectional view of an upper manifold system that includes a plurality of fluid reservoirs and a plurality of gas cylinder assemblies;

FIG. 2 is a partial view of a gas cylinder assembly in accordance with the present disclosure;

FIG. 3 is a cross-sectional view of the cylinder assembly of FIG. 2;

FIG. 4 a cross-section of a portion of the upper manifold system of FIG. 1 illustrating two gas cylinder assemblies and showing the fluid level of the non-solid lubricant in the fluid reservoir;

FIG. 5 is a similar view of FIG. 4 that illustrates the flow of fluid in the gas cylinder assemblies as the piston moves to the retracted piston position; and, FIG. 6 is a similar view of FIG. 4 that illustrates the flow of fluid in the gas cylinder assemblies as the piston moves to the extended piston position.

DETAILED DESCRIPTION OF VARIOUS NON-LIMITING EMBODIMENTS OF DISCLOSURE

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms “a,” “an,” and “the” include plural referents unless the context clearly dictates otherwise.

As used in the specification and in the claims, the term “comprising” may include the embodiments “consisting of” and “consisting essentially of.” The terms “comprise(s),” “include(s),” “having,” “has,” “can,” “contain(s),” and variants thereof, as used herein, are intended to be open-ended transitional phrases, terms, or words that require the presence of the named ingredients/steps and permit the presence of other ingredients/steps. However, such description should be construed as also describing compositions or processes as “consisting of” and “consisting essentially of” the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of “from 2 grams to 10 grams” is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g., "about 2 to about 4" also discloses the range "from 2 to 4." Generally, the terms "about" and "approximately" may refer to plus or minus 10% of the indicated number.

Percentages of elements should be assumed to be percent by weight of the stated element, unless expressly stated otherwise.

In contrast to nitrogen manifold systems mounted on the lower section of the pressing or cushion assemblies, when a nitrogen manifold system is mounted on the moving ram of a press, such a setup inverts the cylinder rods and subsequently the oil does not collect at the bottom portion of the cylinder sleeve. Such a manifold setup is considered an upper mounting manifold setup. In such an arrangement, the piston with high pressure seals axially slides on the inner surface of the cylinder sleeve that has little, if any, oil. Such dry cycling of the high pressure seals can cause early failure or leakage of nitrogen.

One prior art lubrication system for an upper mounting manifold setup is disclosed in U.S. Pat. No. 4,688,775, which is fully incorporated herein by reference. The lubrication arrangement for the cylinder assembly in the manifold causes oil to flow into the bottom portion of the cylinder sleeve of the cylinder assembly to lubricate the seals on the piston to extend the life of the cylinder assembly.

Although the lubrication arrangement disclosed in U.S. Pat. No. 4,688,775 is effective in lubricating the cylinder assembly during use, the oil reservoir used for the lubricating arrangement is positioned on the manifold at a location that is above or below the bottom end of the cylinder in the cylinder assembly to feed the oil into the bottom portion of the cylinders. Such an arrangement results in the height of the manifold arrangement being increased to accommodate the oil reservoir. Also, this lubrication arrangement requires additional gas passageways to control the pressure differential in the cylinder assembly and lubrication arrangement. In some arrangements, a separate pump system that is spaced from the cylinders is required to pump the oil back to the oil reservoir.

In view of the current state of the art of gas cylinder systems, the present inventor has conceived of an improved compact gas cylinder system that can effectively lubricate the components of the gas cylinder system during operation of the gas cylinder system.

Referring now to FIGS. 1-6, there is illustrated a manifold system 100 that can be used in conjunction with a press or cushion arrangement 200 to stamp, punch, mold, etc., materials to parts in the automotive industry, manufacturing industry, medical field, etc. The components of a press or cushion arrangement 200 (e.g., transfer plate, press bolster, lower die, upper die, upper die shoe, lower die shoe, pressure pad, die member, transfer pins, binder, press slide, etc.) are well known in the art, thus the components of press or cushion arrangement 200 and how such components are used to form materials into parts will not be further described herein.

Referring to FIG. 1, manifold system 100 is oriented in the upper mounting manifold setup wherein piston rods 444 of piston 440 of the gas cylinder assemblies 400 are facing downwardly from cylinder sleeve 410 of the gas cylinder assemblies. Gas cylinder assemblies 400 are fluidly connected to fluid reservoir 600. As illustrated in FIG. 1, a plurality of gas cylinder assemblies 400 can be fluidly connected to fluid reservoir 600; however, this is not required. Fluid reservoir 600 is illustrated as oriented such that the longitudinal axis of fluid reservoir 600 is generally perpendicular to the longitudinal axis of cylinder sleeve 410 of gas cylinder assemblies 400; however, this is not required. Manifold system 100 can include one or more gauges 320 and/or other types of monitoring instruments to monitor pressure, temperature, lubricant levels, piston stroke speed, number of piston strokes per minute, etc., during the operation of the manifold system.

Referring now to FIGS. 2-5, there is illustrated a non-limiting gas cylinder assembly 400 that can be used in manifold system 100. Gas cylinder assembly 400 includes a cylinder sleeve 410, an outer tube 500, and a piston 440. Cylinder sleeve 410 includes an interior chamber 412 wherein piston 440 axially moves between extended and retracted piston positions within interior chamber 412. Bottom portion 430 of the cylinder sleeve 410 is telescopically positioned in at least a portion of an inner chamber 510 of outer tube 500. At least a portion of an inner surface 512 of inner chamber 510 of outer tube 500 is spaced from at least a portion of an outer surface 416 of cylinder sleeve 412 to form a cylinder fluid gap 470. At least a portion of a bottom end 432 of cylinder sleeve 412 is spaced from inner surface 512 of inner chamber 510 of outer tube 500. Piston 440 includes one or more piston seals 442 that are used to inhibit or prevent fluid from flowing past the seals and out top end 422 of cylinder sleeve 410. Piston seals 442 are generally polymeric seals; however, other types of materials for the seals can be used. In one particular non-limiting arrangement, the cylinder sleeve 410 is fully spaced from the outer tube 500. As can be appreciated, one or more portions of the cylinder sleeve 410 can optionally contact the outer tube 500.

Figure 4:
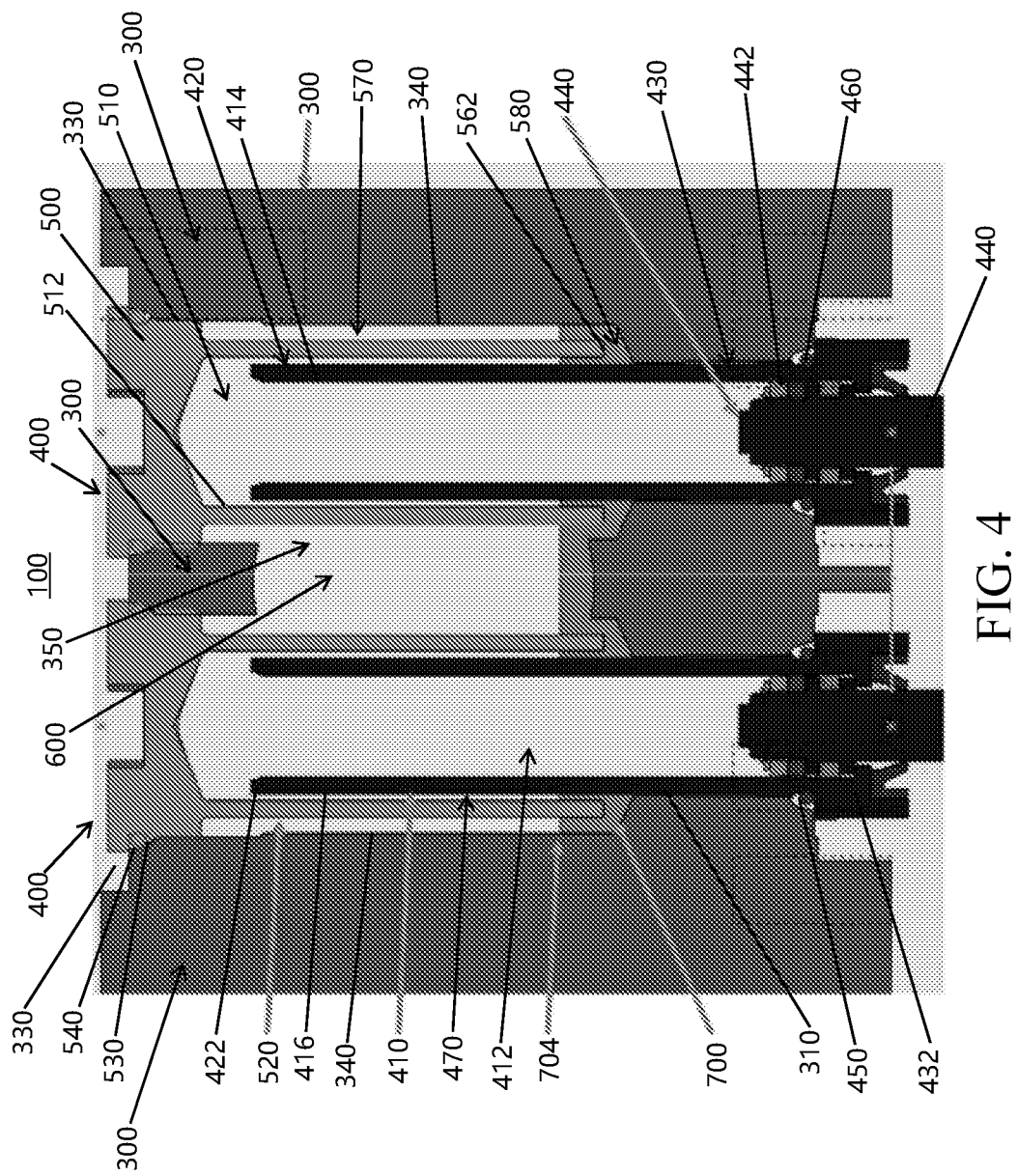

Referring now to FIG. 4, two gas cylinder assemblies 400 are illustrated as mounted in a manifold housing 300. For each of gas cylinder assemblies 400, cylinder sleeve 410 is mounted in a sleeve cavity 310 that is formed in manifold housing 300, and outer tube 500 is mounted in tube cavity 330 that is formed in manifold housing 300. Cylinder sleeve 410 and outer tube 500 can be mounted to manifold housing 300 in any number of arrangement (e.g., threaded arrangement, friction fit, adhesive, slot and groove, etc.). Top portion 420 of the cylinder sleeve 410 can optionally include one or more cylinder seals 460 that are used to inhibit or prevent fluid from flowing between outer surface 416 of cylinder sleeve 410 and manifold sleeve cavity 310. The one or more cylinder seals 460 can be optionally positioned in a cylinder seal groove 450 that facilitates in maintaining the position of cylinder seal 460 relative to cylinder sleeve 410. Top portion 550 of outer tube 500 can optionally include one or more tube seals 540 that are used to inhibit or prevent fluid from flowing between outer surface 520 of outer tube 500 and manifold tube cavity 330. One or more tube seals 540 can be optionally positioned in a tube seal groove 530 that facilitates in maintaining the position of tube seal 540 relative to outer tube 500. When piston 440 is in the retracted piston position, piston 440 is located at or close to bottom end 432 of bottom portion 430 of cylinder sleeve 410. When piston 440 is in the extended piston position, the piston 440 is located at or close to top end 422 of top portion 420 of cylinder sleeve 410.

Figure 3:
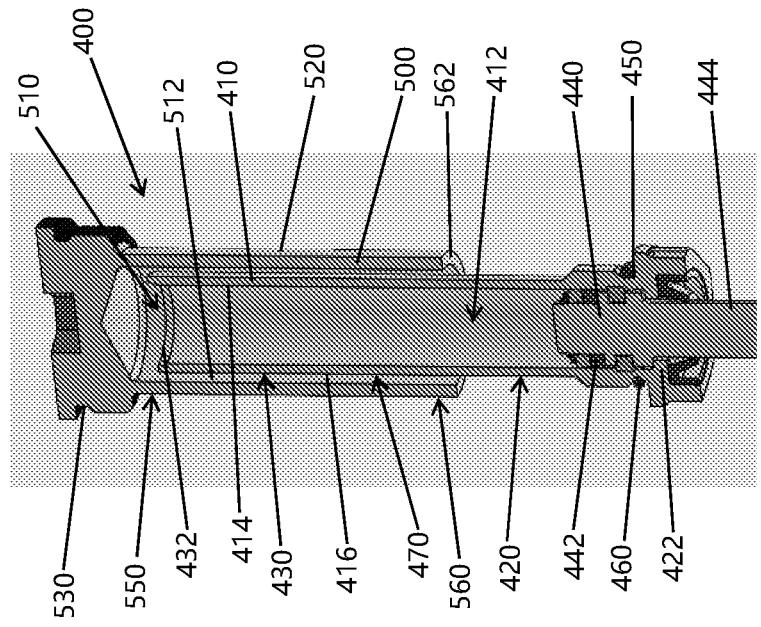
Figure 2:
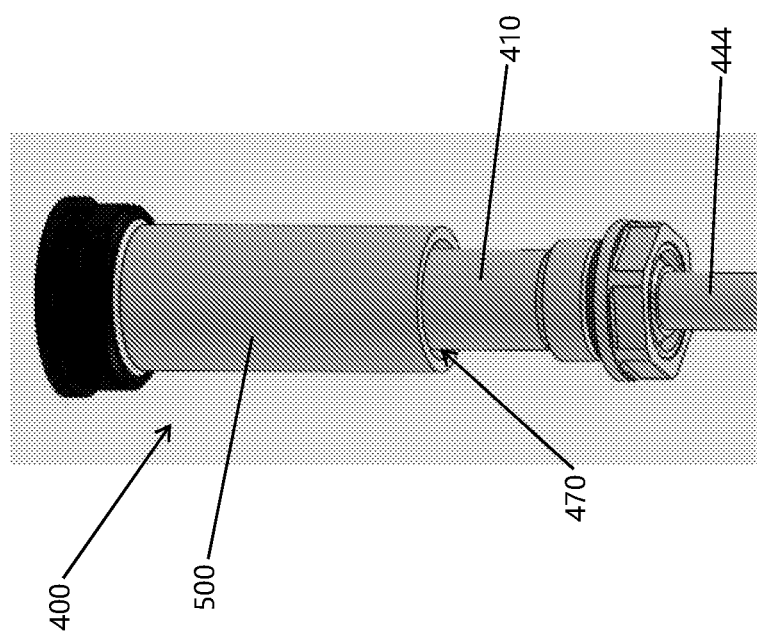

As illustrated in FIGS. 3 and 4, outer tube 500 and cylinder sleeve 410 are generally spaced from one another and are not connected together. The mounting of the outer tube 500 and cylinder sleeve 410 in the manifold housing maintains the relative positions of outer tube 500 and cylinder sleeve 410 to one another. Such configuration of outer tube 500 and cylinder sleeve 410 is novel for a gas cylinder assembly 400 that are used in manifold systems.

A tube fluid gap 570 is formed between outer surface 520 of outer tube 500 and a portion of an inner surface 340 of a wall of manifold housing 300. A bottom fluid gap 580 is located below bottom end 562 of the bottom portion 560 of outer tube 500 and a portion of a wall of manifold housing 300. A non-solid lubricant 700 (e.g., 2 T. oil, etc.) is located in bottom fluid gap 580. As illustrated in FIG. 4, bottom end 562 of outer tube 500 is submerged in non-solid lubricant 700 and at least a portion or all of the bottom end 562 is spaced from the manifold housing 300. As can be appreciated, the fluid level 704 of non-solid lubricant 700 can be such that bottom end 562 of outer tube 500 is not submerged the non-solid lubricant 700. As also illustrated in FIG. 4, the fluid level 704 of non-solid lubricant 700 is such that a portion of cylinder fluid gap 470 and tube fluid gap 570 are also partially filled with the non-solid lubricant; however, as will be appreciated that the fluid level 704 of non-solid lubricant 700 can be such that cylinder fluid gap 470 and/or tube fluid gap 570 are absent non-solid lubricant 700.

Cylinder fluid gap 470 that is configured to allow fluid to flow through cylinder fluid gap 470 as piston 440 axially moves between the extended and retracted piston positions within interior chamber 412 of cylinder sleeve 410. The bottom end 432 of cylinder sleeve 410 is spaced from an interior surface of inner chamber 510 of outer tube 500 to allow fluid to flow between cylinder fluid gap 470 and interior chamber 412 of cylinder sleeve 410. The tube fluid gap 570 is configured to allow fluid to flow into and out of tube fluid gap 570 as piston 440 axially moves between the extended and retracted piston positions within interior chamber 412 of cylinder sleeve 410. The bottom fluid gap 580 is configured to allow fluid to flow between cylinder fluid gap 470 and tube fluid gap 570 as piston 440 axially moves between the extended and retracted piston positions within interior chamber 412 of cylinder sleeve 410.

The size and/or configuration of cylinder fluid gap 470 can optionally be selected to minimize or avoid flow restrictions of fluid through cylinder fluid gap 470 as piston 440 axially moves between the extended and retracted piston positions within interior chamber 412 of cylinder sleeve 410. In one non-limiting arrangement, a total volume of cylinder fluid gap 470 is at least 25% the total volume of interior chamber 412 of cylinder sleeve 410. In addition or alternatively, the minimum cross-sectional area of cylinder fluid gap 470 along a portion or all of the longitudinal length (e.g., 5-100% of the longitudinal length and all values and ranges therebetween) of cylinder fluid gap 470 is at least 50% the cross-sectional area of the opening in the interior chamber 412 at the bottom end of interior chamber 412 of cylinder sleeve 410. By using one or both of these cylinder fluid gap 470 configurations, little or no fluid flow retractions exist as fluid flows between cylinder sleeve 410 and cylinder fluid gap 470.

The size and/or configuration of tube fluid gap 570 can optionally be selected to minimize or avoid flow restrictions of fluid between tube fluid gap 570 and interior chamber 412 of cylinder sleeve 410 as piston 440 axially moves between the extended and retracted piston positions within interior chamber 412 of cylinder sleeve 410. In one non-limiting arrangement, the minimum cross-sectional area of tube fluid gap 570 along a portion or all of the longitudinal length (e.g., 5-100% of the longitudinal length and all values and ranges therebetween) of tube fluid gap 570 is at least 50% the cross-sectional area of the opening in the interior chamber 412 at the bottom end of interior chamber 412 of cylinder sleeve 410.

The size and/or configuration of bottom fluid gap 580 can optionally be selected to minimize or avoid flow restrictions of fluid through the bottom fluid gap 580 as piston 440 axially moves between the extended and retracted piston positions within interior chamber 412 of cylinder sleeve 410. In one non-limiting arrangement, the minimum cross-sectional area of bottom fluid gap 580 along a portion or all of the longitudinal length (e.g., 5-100% of the longitudinal length and all values and ranges therebetween) of bottom fluid gap 580 is at least 50% the cross-sectional area of the opening in the interior chamber 412 at the bottom end of interior chamber 412 of cylinder sleeve 410.

FIG. 4 illustrates fluid reservoir 600 located between outer tubes 500 of two gas cylinder assemblies 400. In one non-limiting arrangement, the cavity located between outer tubes 500 of two gas cylinder assemblies 400 is in direct fluid communication with the fluid reservoir 600 or is a portion of fluid reservoir 600. In such an arrangement, a separate fluid conduit arrangement is not required to allow fluid to flow between fluid reservoir 600 and the cylinder assemblies 400. When the cavity located between outer tubes 500 of two gas cylinder assemblies 400 is a portion of fluid reservoir 600, manifold tube cavity 330 is formed in a top portion of the fluid reservoir and manifold sleeve cavity 310 is formed in a bottom portion of the fluid reservoir such that at least a portion of gas cylinder assemblies 400 extends through fluid reservoir 600 when gas cylinder assemblies 400 is mounted to the manifold housing. In such an arrangement, the tube fluid gap 570 is in direct fluid communication with fluid reservoir 600 or is a portion of fluid reservoir 600. When the one or more gas cylinder assemblies 400 are location in at least a portion of fluid reservoir 600, the non-solid lubricant merely needs to be added in fluid reservoir 600 and filled to the desired level, thereby also filling bottom fluid gap 580 and optionally filling a portion of cylinder fluid gap 470 and tube fluid gap 570 with non-solid lubricant 700. As can be appreciated, when the manifold system is turned and oriented during assembly, non-solid lubricant 700 will move throughout fluid reservoir 600 and gas cylinder assemblies 400; however, once the manifold system is in its final upper manifold setup, non-solid lubricant 700 flows by gravity to the bottom region of fluid reservoir 600 and also fills bottom fluid gap 580 and optionally a portion of cylinder fluid gap 470 and tube fluid gap 570 with the non-solid lubricant 700 prior to the operation of gas cylinder assemblies 400, thus ensuring that non-solid lubricant 700 is the desired location of fluid reservoir 600 and the gas cylinder assemblies 400 prior to the operation of gas cylinder assemblies 400.

Figure 5:
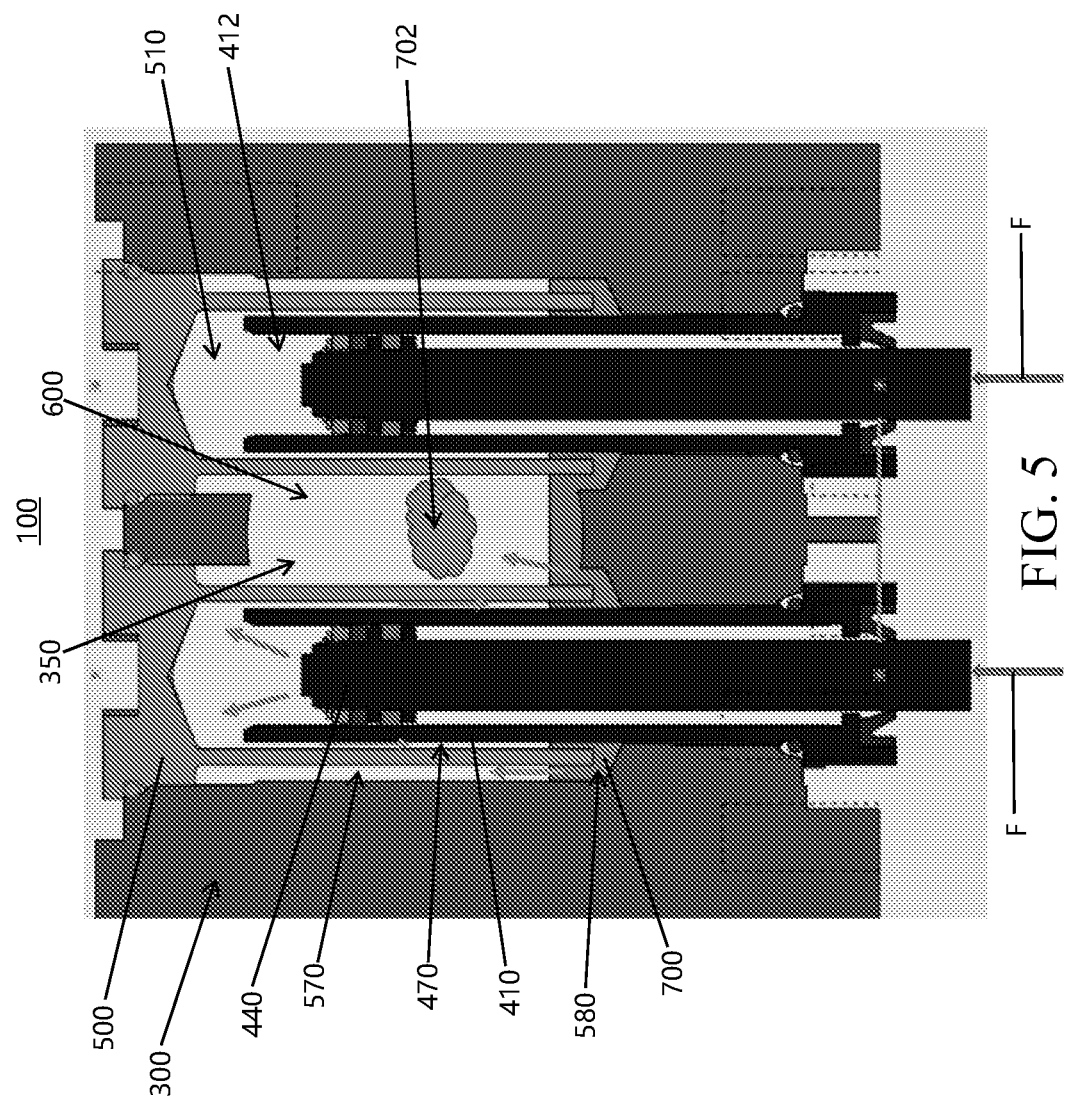
Figure 6:
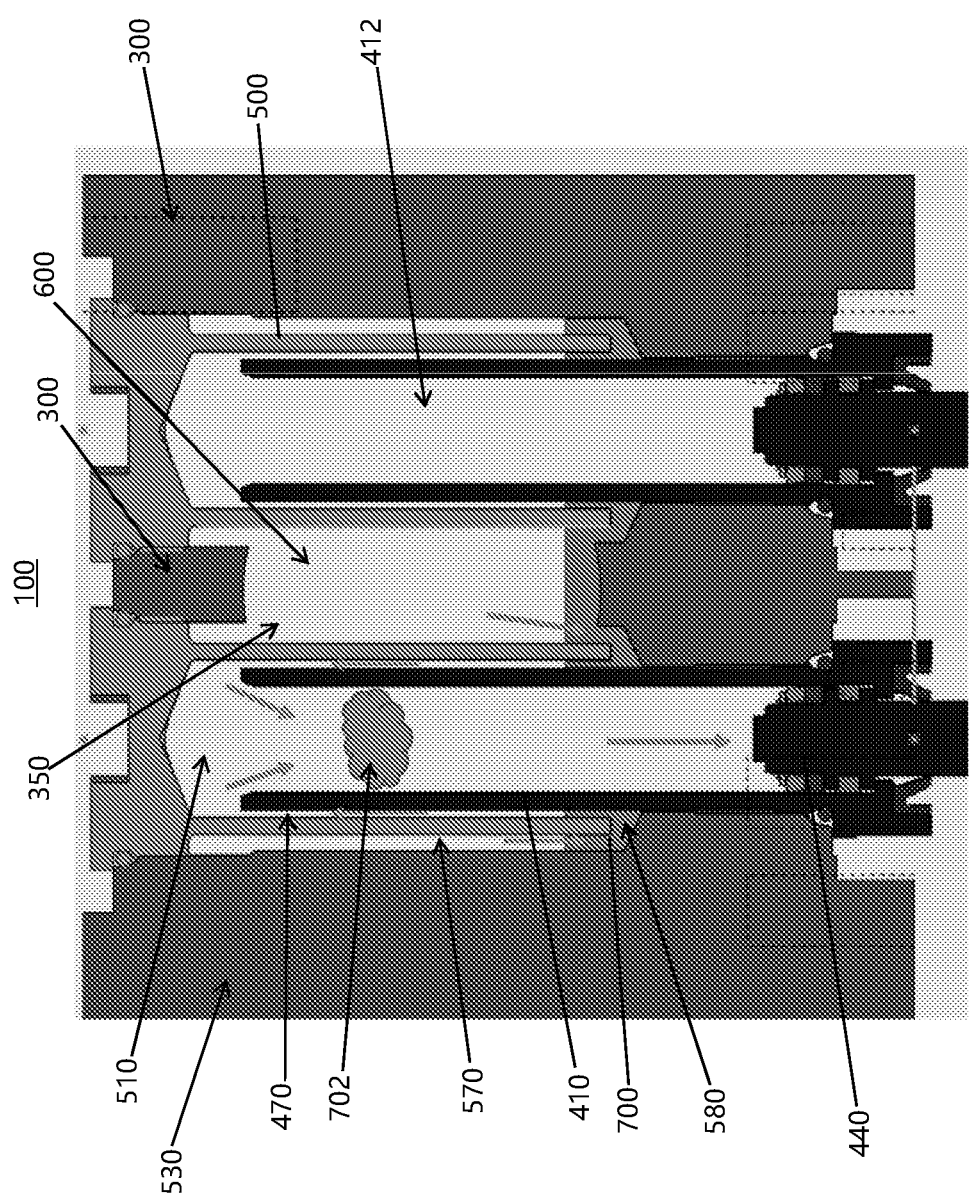

Referring now to FIGS. 1 and 5-6, a non-limiting operation of gas cylinder assembly 400 in manifold housing 300 is illustrated. As illustrated in FIG. 1, cushion arrangement 200 is configured to move up and down as indicated by the arrow. Cushion arrangement 200 is typically moved downwardly by piston rods 444 as piston 440 in cylinder sleeve 410 of each of gas cylinder assemblies 400 moves from the retracted piston position to the extended piston position. In one non-limiting arrangement, cushion arrangement 200 includes a lift mechanism to lift at least a portion of cushion arrangement 200 and thereby apply a force to piston rods 444 to cause piston 440 in cylinder sleeve 410 of each of gas cylinder assemblies 400 to move from the extended piston position to the retracted piston position. Each set of movements of piston 440 from the extended piston position to the retracted piston position and back to the extended piston position is considered a single cycle or stroke of piston 440 in cylinder sleeve 410 of gas cylinder assembly 400.

As piston 440 axially moves between the extended piston position and the retracted piston position in cylinder sleeve 410 of gas cylinder assembly 400, fluid flows between the interior chamber 412 of cylinder sleeve 410 and fluid reservoir 600. The fluid flow arrows in FIGS. 5-6 illustrate the fluid flow direction as piston 440 axially moves between the extended piston position and the retracted piston position in cylinder sleeve 410 of gas cylinder assembly 400.

Referring now to FIG. 5, when piston 440 axially moves toward the retracted piston position in cylinder sleeve 410 of gas cylinder assembly 400 when a force is applied to the piston rods in the direction of force arrows F, the volume of interior chamber 412 between the top of piston 440 and top end 422 of the cylinder sleeve decreases. As discussed above, such movement of piston 440 can be caused by cushion arrangement 200 and/or by some other arrangement. As the volume of interior chamber 412 between the top of piston 440 and top end 422 of the cylinder sleeve decreases, the pressure increases in interior chamber 412 and causes fluid in interior chamber 412 to flow out of interior chamber 412, into cylinder sleeve gap 470, through bottom fluid gap 580 and into tube fluid gap 570 as indicated by the flow arrows. When tube fluid gap 570 and/or manifold cavity 350 are in direct fluid communication with fluid reservoir 600 or are a portion of fluid reservoir 600, fluid from tube fluid gap 570 and/or the manifold cavity 350 flow into fluid reservoir 600 as piston 440 moves to the retracted piston position. As the fluid (e.g., nitrogen gas, nitrogen gas and non-solid lubricant, etc.) flows though and/or passes over non-solid lubricant 700 that is located in cylinder sleeve gap 470, bottom fluid gap 580, and/or tube fluid gap 570, the fluid flow creates turbulence with non-solid lubricant 700 and causes at least a portion of non-solid lubricant 700 to become atomized lubricant 702. The atomization of the non-solid lubricant 700 can occur in cylinder sleeve gap 470, bottom fluid gap 580 and/or tube fluid gap 570. FIG. 4 illustrates the fluid level 704 of non-solid lubricant 700 in cylinder sleeve gap 470, bottom fluid gap 580, and tube fluid gap 570 prior to the operation of gas cylinder assemblies 400 in manifold system 100. After operation of gas cylinder assemblies 400, a portion of all of non-solid lubricant 700 in cylinder sleeve gap 470, bottom fluid gap 580, and/or tube fluid gap 570 will become atomized lubricant 702.

Referring now to FIG. 6, when piston 440 axially moves toward the extended piston position in cylinder sleeve 410 of gas cylinder assembly 400, the volume of interior chamber 412 between the top of piston 440 and top end 422 of cylinder sleeve 410 increases. Generally, the pressurized fluid in fluid reservoir 600 causes such axial movement of piston 440 in cylinder sleeve 410. As the volume of interior chamber 412 between the top of piston 440 and top end 422 of the cylinder sleeve 410 increases, the pressure decreases in interior chamber 412 and causes fluid from fluid reservoir 600 to flow into tube fluid gap 570, then through bottom fluid gap 580, then into cylinder sleeve gap 470, and then into interior chamber 412 of cylinder sleeve 410 as indicated by fluid flow arrows. As the fluid flows into interior chamber 412, atomized lubricant 702 in the fluid enters interior chamber 412 and coats inner wall 414 of interior chamber 412 with lubricant. Again, as the fluid flows though and/or passes over non-solid lubricant 700 that is located in the cylinder sleeve gap 470, bottom fluid gap 580, and/or tube fluid gap 570, the fluid flow creates turbulence with non-solid lubricant 700 and causes at least a portion of non-solid lubricant 700 to become atomized lubricant 702.

The fluid pathways illustrated in FIGS. 5-6 are repeated as piston 440 moves axially within cylinder sleeve 410 of each of the gas cylinder assemblies during the operation of manifold system 100, thereby constantly and continuously lubricating inner wall 414 of interior chamber 412.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall there between. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

What is claimed:

1. A gas cylinder assembly comprising:
   an outer tube supported in a first cavity of a housing; said outer tube includes an inner chamber;
   a cylinder sleeve supported in a second cavity of the housing; said cylinder sleeve includes an interior chamber; at least a portion of a bottom portion of said cylinder sleeve is telescopically positioned at least a portion of said inner chamber of said outer tube;
   a piston; said piston axially movable between extended and retracted piston positions within said interior chamber;
   a cylinder fluid gap formed between at least a portion of an inner surface of said outer tube and at least a portion of an outer surface of said cylinder sleeve; said cylinder fluid gap allows fluid flow through said cylinder fluid gap;
   a tube fluid gap formed between at least a portion of an outer surface of said outer tube and at least a portion of an inner surface of the manifold housing; said tube fluid gap allows fluid flow into and out of said tube fluid gap; and
   a bottom end gap formed between a bottom end of said outer tube and the housing; said bottom fluid gap allows fluid flow between said cylinder fluid gap and said tube fluid gap.

2. The gas cylinder assembly as defined in claim 1, wherein at least a portion of a bottom end of said cylinder sleeve is spaced from an interior surface of said inner chamber of said outer tube.

3. The gas cylinder assembly as defined in claim 1, wherein at least a portion of said bottom fluid gap, said cylinder fluid gap, and/or said tube fluid gap includes non-solid lubricant.

4. The gas cylinder assembly as defined in claim 3, wherein a fluid level of said non-solid lubricant in said bottom fluid gap is such that at least a portion of said bottom end of said outer tube is submerged in said non-solid lubricant.

5. The gas cylinder assembly as defined in claim 1, wherein said piston includes a seal arrangement to inhibit fluid from flowing out a top end of said cylinder sleeve.

6. The gas cylinder assembly as defined in claim 1, wherein a total volume of said cylinder fluid gap is at least 25% a total volume of said interior chamber of said cylinder sleeve.

7. The gas cylinder assembly as defined in claim 1, wherein a minimum cross-sectional area of said cylinder fluid gap is at least 25% a cross-sectional area of an opening in at said bottom end of said interior chamber of said cylinder sleeve.

8. The gas cylinder assembly as defined in claim 1, wherein a minimum cross-sectional area of said tube fluid gap is at least 25% a cross-sectional area of an opening in at said bottom end of said interior chamber of said cylinder sleeve.

9. The gas cylinder assembly as defined in claim 1, wherein a minimum cross-sectional area of said bottom fluid gap is at least 25% a cross-sectional area of an opening in at said bottom end of said interior chamber of said cylinder sleeve.

10. A manifold system that includes a cylinder assembly comprising:
   a manifold housing; said manifold housing having first and second cavities; and
   a first gas cylinder assembly; said first gas cylinder assembly includes:
      an outer tube supported in said first cavity of said manifold housing; said outer tube includes an inner chamber;
      a cylinder sleeve supported in said second cavity of said manifold housing; said cylinder sleeve includes an interior chamber; at least a portion of a bottom portion of said cylinder sleeve is telescopically positioned at least a portion of said inner chamber of said outer tube;
      a piston; said piston axially movable between extended and retracted piston positions within said interior chamber;
      a cylinder fluid gap formed between at least a portion of an inner surface of said outer tube and at least a portion of an outer surface of said cylinder sleeve; said cylinder fluid gap allows fluid flow through said cylinder fluid gap;
      a tube fluid gap formed between at least a portion of an outer surface of said outer tube and at least a portion of an inner surface of said manifold housing; said tube fluid gap allows fluid flow into and out of said tube fluid gap; and
      a bottom end gap formed between a bottom end of said outer tube and said manifold housing; said bottom fluid gap allows fluid flow between said cylinder fluid gap and said tube fluid gap.

11. The manifold system as defined in claim 10, wherein at least a portion of said bottom fluid gap, said cylinder fluid gap, and/or said tube fluid gap includes non-solid lubricant.

12. The manifold system as defined in claim 11, wherein a fluid level of said non-solid lubricant in said bottom fluid gap is such that at least a portion of said bottom end of said outer tube is submerged in said non-solid lubricant.

13. The manifold system as defined in claim 11, wherein a fluid that enters into said interior chamber of said cylinder sleeve includes atomized non-solid lubricant that at least partially lubricates an inner surface of said interior chamber of said cylinder sleeve as said piston moves toward said top end of said cylinder sleeve; said atomized non-solid lubricant is at least partially formed in said bottom fluid gap, said cylinder fluid gap, and/or said tube fluid gap.

14. The manifold system as defined in claim 10, wherein manifold housing includes a fluid reservoir; said fluid reservoir is positioned relative to said cylinder sleeve such that at least a portion of said fluid reservoir is located between said top and bottom ends of said cylinder sleeve.

15. The manifold system as defined in claim 14, wherein said fluid reservoir at least partially forms said bottom fluid gap and/or said tube fluid gap.

16. The manifold assembly as defined in claim 10, wherein a total volume of said cylinder fluid gap is at least 25% a total volume of said interior chamber of said cylinder sleeve.

17. The manifold assembly as defined in claim 10, wherein a minimum cross-sectional area of said cylinder fluid gap is at least 25% a cross-sectional area of an opening in at said bottom end of said interior chamber of said cylinder sleeve.

18. The manifold assembly as defined in claim 10, wherein a minimum cross-sectional area of said tube fluid gap is at least 25% a cross-sectional area of an opening in at said bottom end of said interior chamber of said cylinder sleeve.

19. The manifold assembly as defined in claim 10, wherein a minimum cross-sectional area of said bottom fluid gap is at least 25% a cross-sectional area of an opening in at said bottom end of said interior chamber of said cylinder sleeve.

20. The manifold system as defined in claim 10, further including a second gas cylinder assembly; said second gas cylinder assembly is positioned adjacent to and spaced from said first gas cylinder assembly; said second gas cylinder assembly having a configuration that is similar to said first gas cylinder; and
   wherein said fluid that enters into said interior chamber of said cylinder sleeve of said second gas cylinder assembly includes atomized non-solid lubricant that at least partially lubricates an inner surface of said interior chamber of said cylinder sleeve as said piston moves toward said top end of said cylinder sleeve.

21. A method for lubrication of a gas cylinder assembly comprising:
   providing a gas cylinder assembly; said gas cylinder assembly includes:
      an outer tube supported in a first cavity of a housing; said outer tube includes an inner chamber;
      a cylinder sleeve supported in a second cavity of said housing; said cylinder sleeve includes an interior chamber; at least a portion of a bottom portion of said cylinder sleeve is telescopically positioned at least a portion of said inner chamber of said outer tube;

a piston; said piston axially movable between extended and retracted piston positions within said interior chamber;
a non-solid lubricant;
a cylinder fluid gap formed between at least a portion of an inner surface of said outer tube and at least a portion of an outer surface of said cylinder sleeve; said cylinder fluid gap allows fluid flow through said cylinder fluid gap as said piston axially moves between said extended and retracted piston positions;
a tube fluid gap formed between at least a portion of an outer surface of said outer tube and at least a portion of an inner surface of the manifold housing; said tube fluid gap allows fluid flow into and out of said tube fluid gap as said piston axially moves between said extended and retracted piston positions; and
a bottom end gap formed between at least a portion of a bottom end of said outer tube and said housing; said bottom fluid gap allows fluid flow between said cylinder fluid gap and said tube fluid gap as said piston axially moves between said extended and retracted piston positions; said bottom end gap includes non-solid lubricant;
moving said piston from said retracted piston position to said extended piston position to cause a fluid to flow from said tube fluid gap, into and through said bottom fluid gap, into and through said cylinder fluid gap, and then into said interior chamber of said cylinder sleeve; and
wherein said fluid that passes into and through said bottom fluid gap at least partially interacts with said non-solid lubricant in said bottom fluid gap to thereby cause at least a portion of said non-solid lubricant to become atomized and mixed with said fluid; and
wherein said atomized non-solid lubricant at least partially lubricates an inner surface of said interior chamber of said cylinder sleeve after said atomized non-solid lubricant enters into said interior chamber of said cylinder sleeve.

22. A molding or stamping system comprising:
a molding or stamping arrangement that causes a material to be molded, shaped, and/or stamped;
a manifold system that includes a gas cylinder assembly; said gas cylinder assembly facilitates in moving one or more components of said molding or stamping arrangement to cause the material to be molded, shaped, and/or stamped; said manifold system including:
  a manifold housing; said manifold housing including first and second cavities; and
  a first gas cylinder assembly; said first gas cylinder assembly gas cylinder assembly includes:
    an outer tube supported in said first cavity of said manifold housing; said outer tube includes an inner chamber;
    a cylinder sleeve supported in said second cavity of said manifold housing; said cylinder sleeve includes an interior chamber; at least a portion of a bottom portion of said cylinder sleeve is telescopically positioned at least a portion of said inner chamber of said outer tube;
    a piston; said piston axially movable between extended and retracted piston positions within said interior chamber;
    a cylinder fluid gap formed between at least a portion of an inner surface of said outer tube and at least a portion of an outer surface of said cylinder sleeve; said cylinder fluid gap allows fluid flow through said cylinder fluid gap;
    a tube fluid gap formed between at least a portion of an outer surface of said outer tube and at least a portion of an inner surface of the manifold housing; said tube fluid gap allows fluid flow into and out of said tube fluid gap; and
    a bottom end gap formed between at least a portion of a bottom end of said outer tube and the manifold housing; said bottom fluid gap allows fluid flow between said cylinder fluid gap and said tube fluid gap.

23. The molding or stamping system as defined in claim 22, wherein at least a portion of said bottom fluid gap, said cylinder fluid gap, and/or said tube fluid gap includes non-solid lubricant.

24. The molding or stamping system as defined in claim 23, wherein a fluid level of said non-solid lubricant in said bottom fluid gap is such that at least a portion of said bottom end of said outer tube is submerged in said non-solid lubricant.

25. The molding or stamping system as defined in claim 23, wherein a fluid that enters into said interior chamber of said cylinder sleeve includes atomized non-solid lubricant that at least partially lubricates an inner surface of said interior chamber of said cylinder sleeve as said piston moves toward said top end of said cylinder sleeve; said atomized non-solid lubricant is at least partially formed in said bottom fluid gap, said cylinder fluid gap, and/or said tube fluid gap.

26. The molding or stamping system as defined in claim 22, wherein manifold housing includes a fluid reservoir; said fluid reservoir is positioned relative to said cylinder sleeve such that at least a portion of said fluid reservoir is located between said top and bottom ends of said cylinder sleeve.

27. The molding or stamping system as defined in claim 26, wherein said fluid reservoir at least partially forms said bottom fluid gap and/or said tube fluid gap.

28. The molding or stamping system as defined in claim 22, wherein a total volume of said cylinder fluid gap is at least 25% a total volume of said interior chamber of said cylinder sleeve.

29. The molding or stamping system as defined in claim 22, wherein a minimum cross-sectional area of said cylinder fluid gap is at least 25% a cross-sectional area of an opening in at said bottom end of said interior chamber of said cylinder sleeve.

30. The molding or stamping system as defined in claim 22, wherein a minimum cross-sectional area of said tube fluid gap is at least 25% a cross-sectional area of an opening in at said bottom end of said interior chamber of said cylinder sleeve.

31. The molding or stamping system as defined in claim 22, wherein a minimum cross-sectional area of said bottom fluid gap is at least 25% a cross-sectional area of an opening in at said bottom end of said interior chamber of said cylinder sleeve.

32. The molding or stamping system as defined in claim 22, further including a second gas cylinder assembly; said second gas cylinder assembly is positioned adjacent to and spaced from said first gas cylinder assembly; said second gas cylinder assembly having a configuration that is similar to said first gas cylinder; and
wherein said fluid that enters into said interior chamber of said cylinder sleeve of said second gas cylinder assembly includes atomized non-solid lubricant that at least partially lubricates an inner surface of said interior chamber of said cylinder sleeve as said piston moves toward said top end of said cylinder sleeve.

\* \* \* \* \*